(12) United States Patent
Bourgois

(10) Patent No.: US 9,919,502 B2
(45) Date of Patent: Mar. 20, 2018

(54) METHOD AND APPARATUS FOR PREPARING A SURFACE FOR BONDING A MATERIAL THERETO

(71) Applicant: Roller Bearing Company of America, Inc., Oxford, CT (US)

(72) Inventor: Louis Bourgois, Bienne (CH)

(73) Assignee: Schaublin SA, Delemont (CH)

(*) Notice: Subject to any disclaimer, the term of this patent is extended or adjusted under 35 U.S.C. 154(b) by 0 days.

(21) Appl. No.: 14/692,705

(22) Filed: Apr. 21, 2015

(65) Prior Publication Data

US 2015/0306705 A1    Oct. 29, 2015

Related U.S. Application Data

(60) Provisional application No. 61/982,916, filed on Apr. 23, 2014.

(51) Int. Cl.
*B23K 26/36* (2014.01)
*B32B 37/00* (2006.01)
(Continued)

(52) U.S. Cl.
CPC ...... *B32B 37/0076* (2013.01); *B23K 26/0006* (2013.01); *B23K 26/0078* (2013.01);
(Continued)

(58) Field of Classification Search
CPC .... C09J 5/02; C09J 2205/31; C09J 2400/163; C09J 2400/166; F16C 43/00; B23K 26/362; B23K 2203/50; B23K 26/0006; B23K 26/0078; B32B 37/18; B32B 37/1292; B32B 37/0076; B32B 38/0008
(Continued)

(56) References Cited

U.S. PATENT DOCUMENTS 4,861,407 A   8/1989 Volkmann et al.
4,894,115 A   1/1990 Eichelberger et al.
(Continued)

FOREIGN PATENT DOCUMENTS

CN    1934209 A     3/2007
DE    102007006634 A1   8/2008
(Continued)

OTHER PUBLICATIONS

Extended European Search Report for EP15164839.1-1308, dated Aug. 27, 2015.

*Primary Examiner* — Vishal I Patel
(74) *Attorney, Agent, or Firm* — Murtha Cullina LLP

(57) ABSTRACT

A method for preparing a surface of a substrate for bonding a material to the surface. The apparatus employed includes one or more optical amplification devices (OAD), one or more drivers, the substrate and a base. The one or more OAD and/or the substrate are moveably coupled to the one or more drivers. The one or more OAD is activated to emit a beam of energy. The one or more OAD and/or the substrate move relative to one another while the one or more OAD is activated. The movement of the one or more OAD and/or the substrate relative to one another forms (via the beam of energy) a pattern on the surface of the substrate. The pattern formed on the surface of the substrate allows the material to bond with a greater degree of adhesion.

18 Claims, 16 Drawing Sheets

(51) Int. Cl.
- *B23K 26/362* (2014.01)
- *C09J 5/02* (2006.01)
- *B32B 37/12* (2006.01)
- *B32B 37/18* (2006.01)
- *B32B 38/00* (2006.01)
- *F16C 43/00* (2006.01)
- *B23K 26/00* (2014.01)
- *B23K 26/361* (2014.01)
- *B23K 103/00* (2006.01)

(52) U.S. Cl.
CPC .......... *B23K 26/361* (2015.10); *B23K 26/362* (2013.01); *B32B 37/1292* (2013.01); *B32B 37/18* (2013.01); *B32B 38/0008* (2013.01); *C09J 5/02* (2013.01); *F16C 43/00* (2013.01); *B23K 2203/50* (2015.10); *C09J 2205/31* (2013.01); *C09J 2400/163* (2013.01); *C09J 2400/166* (2013.01)

(58) Field of Classification Search
USPC .......................................... 156/750, 751, 764
See application file for complete search history.

(56) References Cited

U.S. PATENT DOCUMENTS

| | | | |
|---|---|---|---|
| 4,968,383 A | 11/1990 | Volkmann et al. | |
| 5,108,780 A | 4/1992 | Pitt et al. | |
| 5,478,426 A | 12/1995 | Wiler et al. | |
| 5,514,391 A | 5/1996 | Bushnell et al. | |
| 5,703,341 A | 12/1997 | Lowndes et al. | |
| 5,755,945 A | 5/1998 | Kristiansen | |
| 5,980,681 A | 11/1999 | Siemroth et al. | |
| 6,013,894 A | 1/2000 | Cheng et al. | |
| 6,126,802 A | 10/2000 | Utklev | |
| 6,624,383 B1 | 9/2003 | Lichtenstein et al. | |
| 9,039,963 B2 | 5/2015 | Fisk et al. | |
| 9,117,680 B2 | 8/2015 | Fisk | |
| 2006/0097430 A1 | 5/2006 | Xiaochun et al. | |
| 2008/0213612 A1* | 9/2008 | Starikov | B23K 1/0008 428/573 |
| 2010/0258542 A1 | 10/2010 | Meyer et al. | |
| 2010/0320579 A1 | 12/2010 | Abbott | |
| 2012/0128282 A1* | 5/2012 | Voisine | F16C 23/046 384/145 |
| 2012/0128288 A1 | 5/2012 | Guilford | |
| 2012/0292297 A1 | 11/2012 | Morikazu et al. | |
| 2013/0034705 A1 | 2/2013 | Matsen et al. | |
| 2013/0192751 A1 | 8/2013 | Arai et al. | |
| 2013/0209735 A1 | 8/2013 | Kim et al. | |
| 2014/0322649 A1 | 10/2014 | Choi et al. | |
| 2014/0374009 A1 | 12/2014 | Mzabi et al. | |

FOREIGN PATENT DOCUMENTS

| | | |
|---|---|---|
| DE | 102007023418 A1 | 11/2008 |
| DE | 102009017492 | 12/2010 |
| JP | 2013154366 A | 8/2013 |
| KR | 1020120093898 A | 8/2012 |
| WO | 9115363 A1 | 10/1991 |
| WO | 9633837 A1 | 10/1996 |
| WO | 9721779 A1 | 6/1997 |
| WO | 2011131757 A1 | 10/2011 |
| WO | 2015006464 A1 | 1/2015 |

* cited by examiner

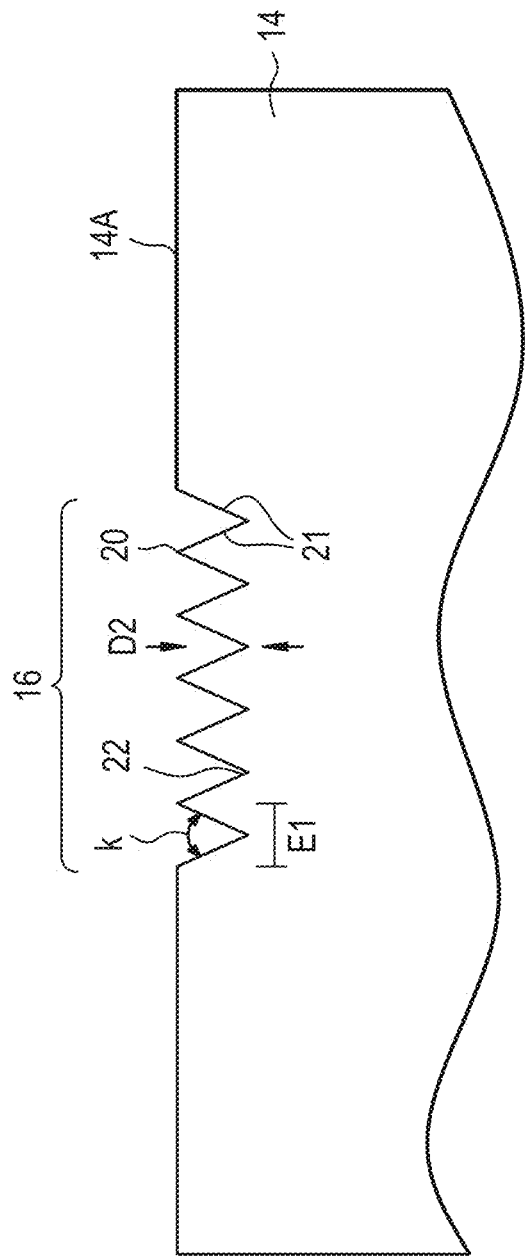

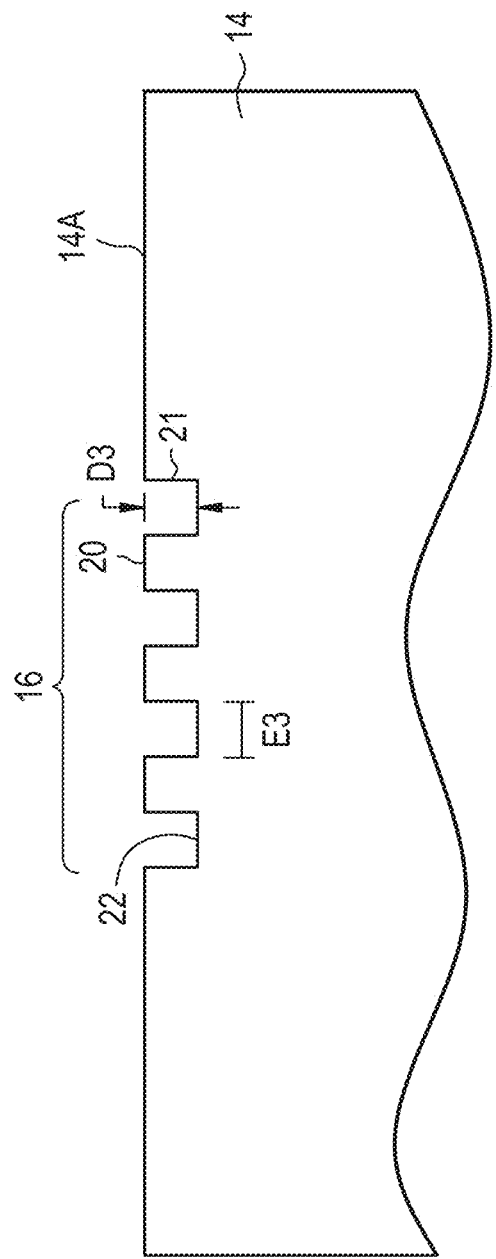

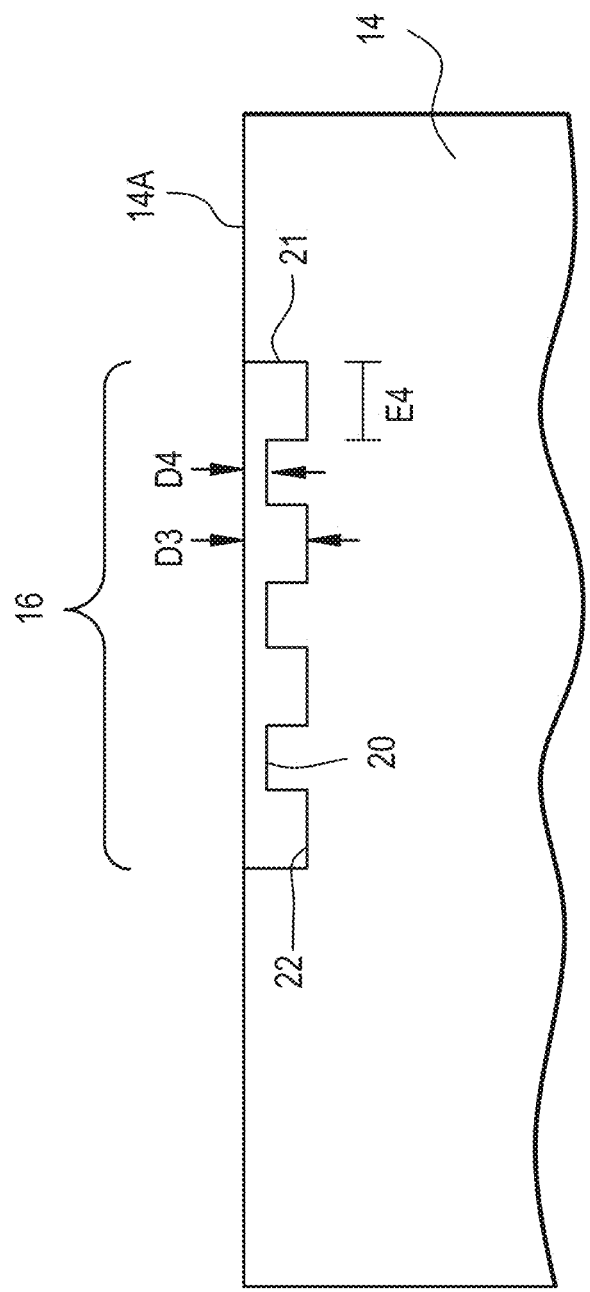

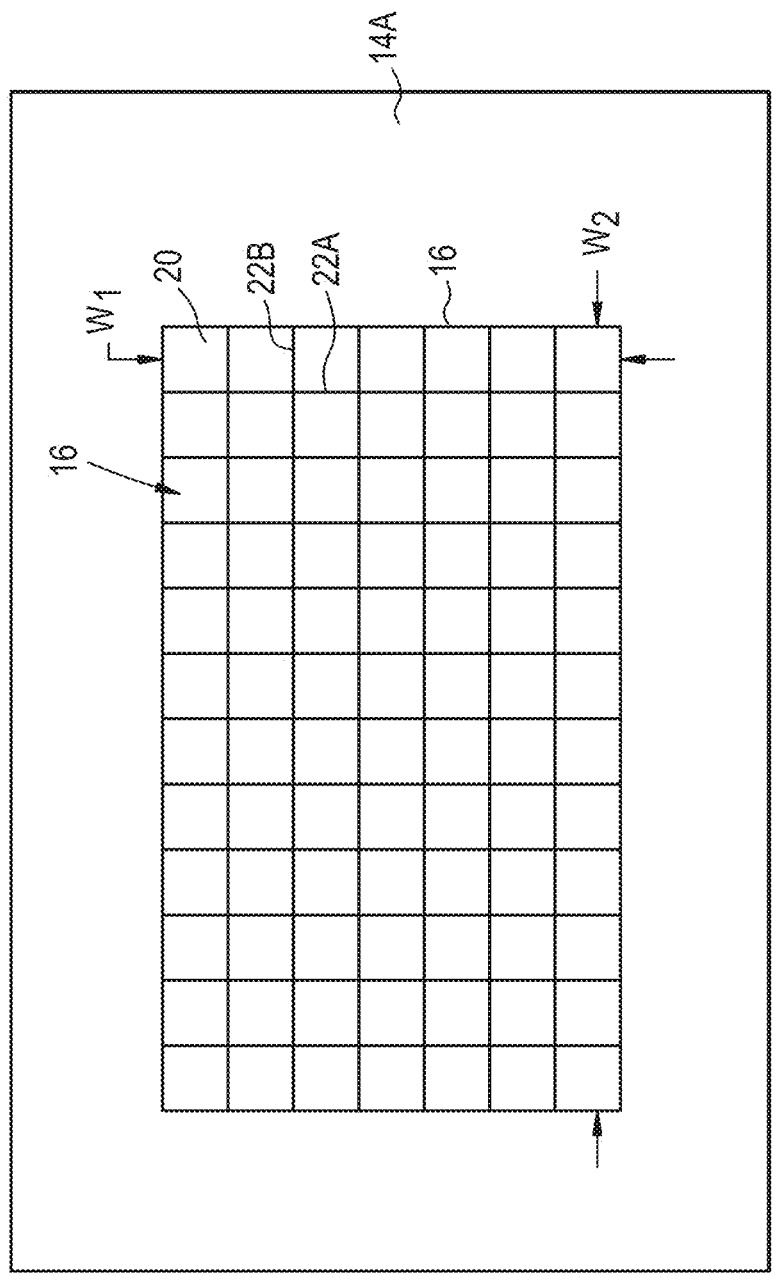

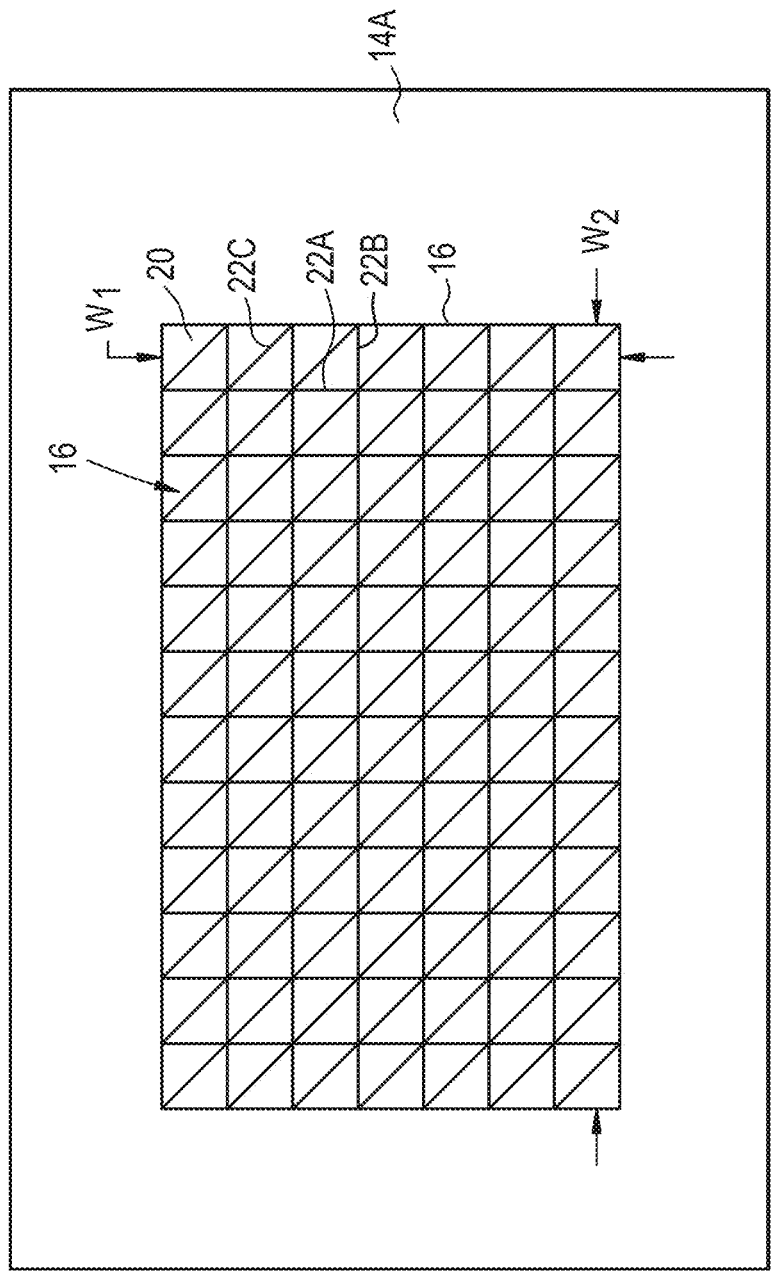

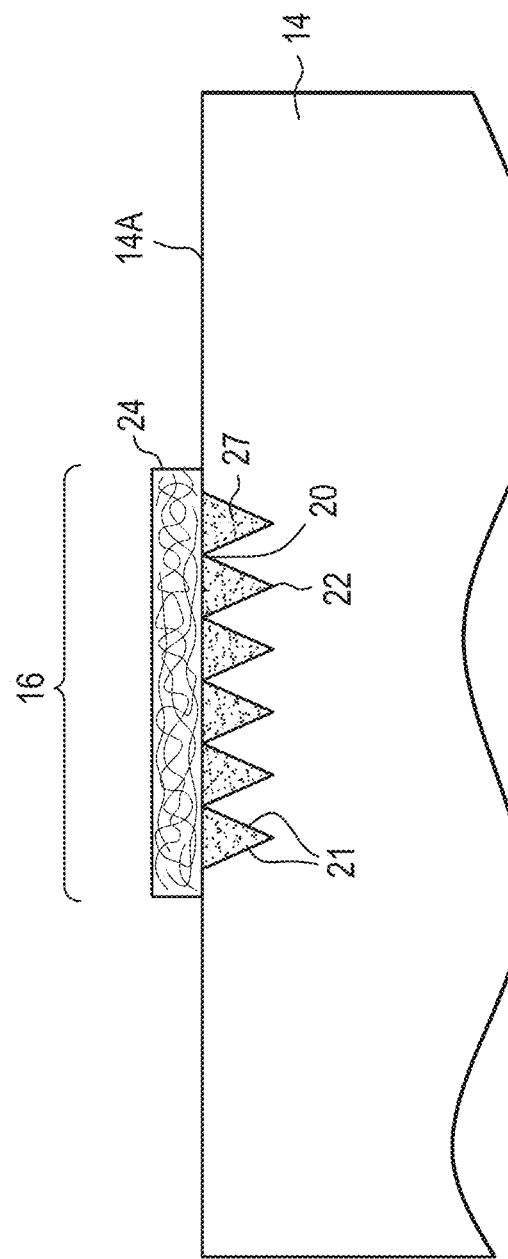

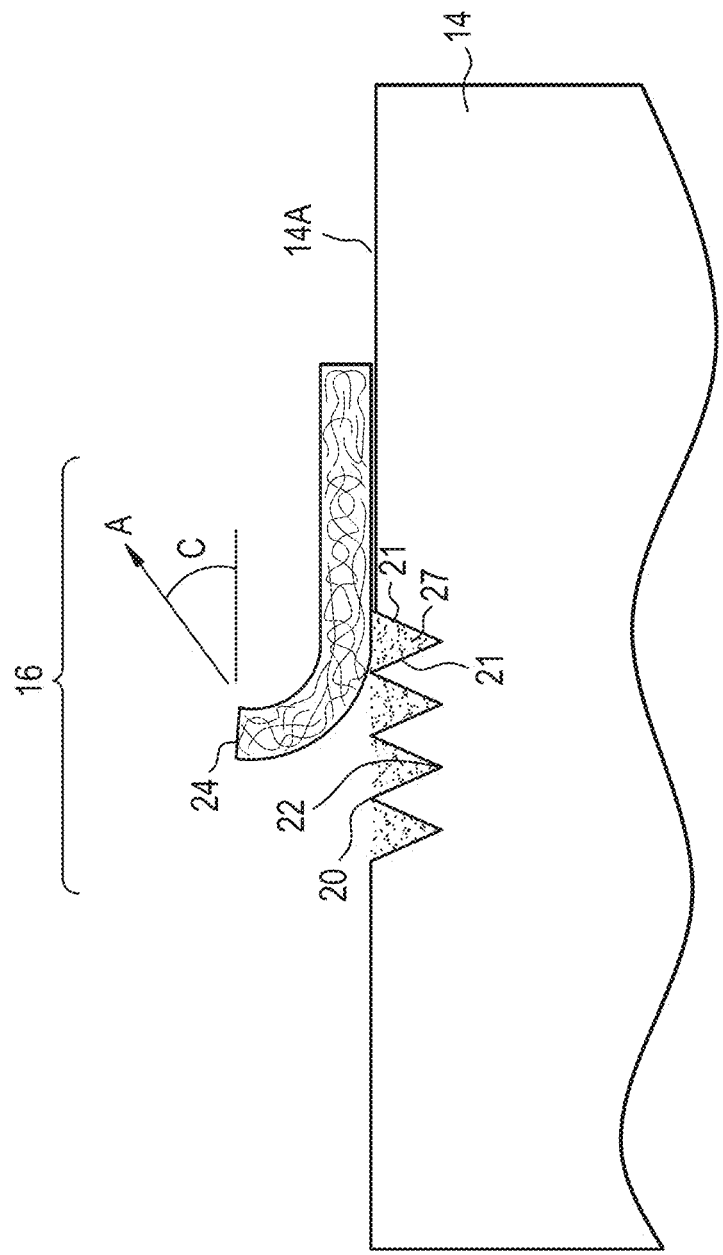

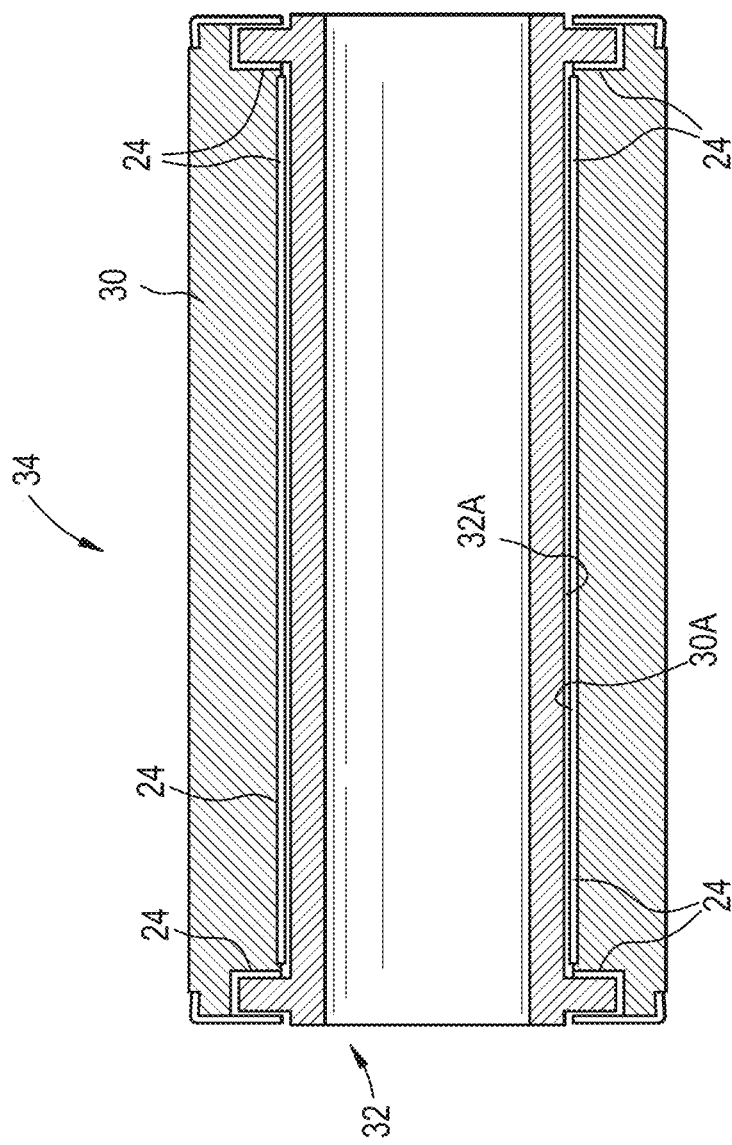

METHOD AND APPARATUS FOR PREPARING A SURFACE FOR BONDING A MATERIAL THERETO

CROSS REFERENCE TO RELATED APPLICATIONS

This application claims priority to U.S. Provisional Patent Application No. 61/982,916, filed Apr. 23, 2014, the subject matter of which is incorporated herein by reference in its entirety.

FIELD OF THE INVENTION

The present invention relates to a method for preparing a surface for bonding a material (e.g., a flexible liner) to the surface, and more particularly to the use of an optical amplification device such as a laser to form a pattern on the surface, thus enhancing the peak strength of the bond in peel testing as compared to other methods of surface preparation in which masking is not required. Similarly, the present invention relates to an apparatus for preparing a surface for bonding a material (e.g., a flexible liner) to the surface, and more particularly to an apparatus including the optical amplification device such as the laser, a substrate, one or more drivers moveably coupled to the optical amplification device and/or the substrate, a base to which the one or more drivers are fixed and a computer which controls the movement of the drivers.

BACKGROUND

The degree of adhesion or bonding of a material (e.g., a flexible liner) to a substrate (e.g., a metal surface) may be influenced by the cleanliness, quality and configuration of a surface of the substrate. Thus, there have been attempts to improve or alter the surface of the substrate in preparation for adhesion of a material thereto. One method typically employed in preparation of surfaces for bonding consists solely of degreasing the surface. However, degreasing alone does not, in most cases, prepare a surface for a bond of adequate peak load in peel tests. Degreasing followed by chemically etching the surface for bonding has also been used as a surface preparation method. However, the chemical etching procedure is cumbersome, tedious and time consuming. Another common surface preparation method is degreasing followed by mechanical abrasion of the surface for bonding, including shot peening and/or sand blasting. Prior art methods for surface preparation also typically require masking of adjacent surfaces that should not be prepared or otherwise altered. Masking techniques include taping and selective plating. However, control of the size and dimensions of the surface to be prepared and the boundaries between the surface to be prepared and the masked surface are difficult to control.

Those skilled in the relevant art have long sought but have been unable to arrive at a method to prepare a surface for bonding a material thereto which results in a high peak strength in peel testing and does not require masking.

SUMMARY OF THE INVENTION

The present invention resides in one aspect in a method for preparing a surface of a substrate for bonding a material thereto. The method makes use of one or more drivers (e.g., servo motors), one or more optical amplification devices (OAD) (e.g., lasers), a base to which the one or more drivers are fixed, and a computer which controls the motion of the one or more drivers. Both the OAD and the substrate are connected to the driver(s). In one embodiment, both the OAD and the substrate are moved by the driver(s), and move relative to one another. In another embodiment, the OAD is stationary while the substrate moves relative to the OAD. In yet another embodiment, the substrate is stationary while the OAD moves relative to the substrate. The OAD emits a beam of energy, forming a pattern on the surface. The movement of the OAD relative to the substrate, the substrate relative to the OAD or the OAD and the substrate relative to one another dictates the pattern formed.

In one embodiment, a material (e.g., a flexible liner) is bonded to the surface using an adhesive, such as a resin. Using peel tests, in which the material is peeled from the surface, certain characteristics of the bond are measured. The inventors were able to measure, among other attributes, the peak strength of the bond. It was found that surfaces prepared via the method discussed herein produced a higher peak strength than surfaces prepared via methods disclosed in prior art, such as shot peening and sand blasting. Furthermore, the method of the present invention does not require masking prior to preparing the surface.

In one embodiment, the pattern consists of a series of protrusions and depressions. In another embodiment, this series of protrusions and depressions is extended to form lines. In another embodiment, the OAD is rapidly charged and discharged to create a series of points or dimples. In one embodiment, the formation of the pattern creates a shape, the dimensions of which are based on where, about coordinates within a plane, the pattern begins and ends. The formation of the patterns, using the OAD, controls the dimensions of the shape within 0.002 inches. Formation of the pattern in this manner eliminates the need for masking, greatly reducing surface preparation time and tediousness. Accuracy of the boundary of the pattern is also improved over prior art methods.

In one embodiment, the pattern is formed using the OAD on a bearing surface, such as a surface of an inner race of a bearing (e.g., an outer bearing surface) and/or a surface of an outer race of a bearing (e.g., an inner bearing surface). In one embodiment, the material is bonded to the inner bearing surface and/or the outer bearing surface.

BRIEF DESCRIPTION OF THE DRAWINGS

FIG. 2A is a front cross sectional view of the substrate for bonding, illustrating one embodiment of a pattern.

FIG. 2C is a front cross sectional view of the substrate for bonding wherein the pattern includes indentations which are orthogonal to the surface.

FIG. 2D is a front cross sectional view of the substrate for bonding, wherein the pattern includes the indentations which are orthogonal to the surface and are countersunk.

FIG. 3A is a top view of the surface of the substrate for bonding, illustrating an alternative embodiment of the pattern in which the pattern includes a series of rows of orthogonal lines.

FIG. 3B is a top view of the surface of the substrate for bonding, illustrating an alternative embodiment of the pattern in which the pattern includes a series of rows of orthogonal lines and a series of rows of lines extending across the pattern at an angle other than 90 degrees.

FIG. 4 is a front cross sectional view of the substrate in which a material is adhered to the surface of the substrate.

FIG. 5 is a front cross sectional view of the substrate in which the material is being peeled from the surface of the substrate, illustrating a peel test.

FIG. 12 is a front cross sectional view of a bearing in which the material is disposed between an outer ring and an inner ring.

DETAILED DESCRIPTION

Figure 1:
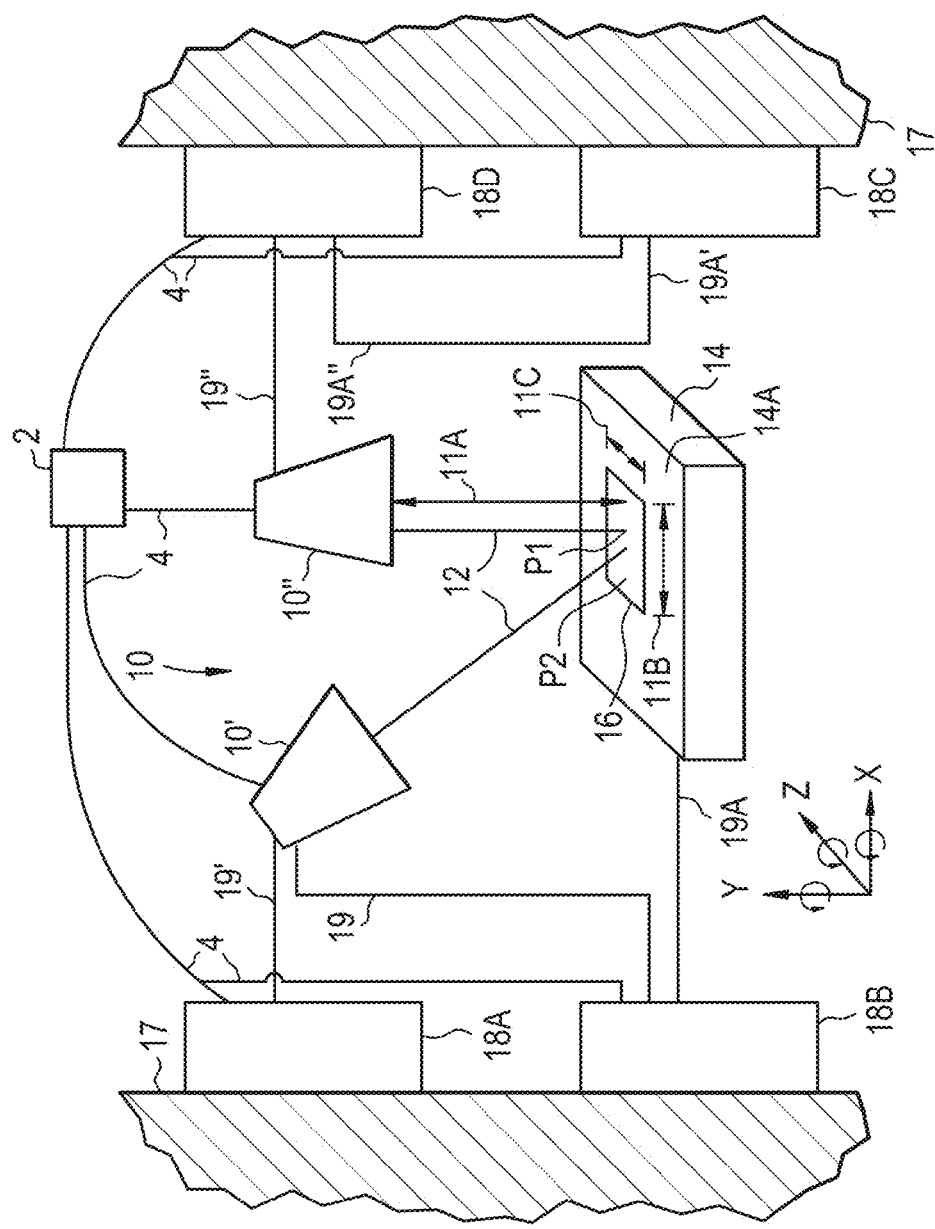
FIG. 1 is a perspective schematic view of an apparatus used for conducting the surface preparation method of the present invention.

As shown in FIG. 1, an optical amplification system (OAS) is generally designated by the numeral 10. As described further herein, the OAS 10 emits beams of energy 12 to form a pattern 16 on a surface 14A (e.g., a flat surface, as shown) of a substrate 14 for bonding a material thereto (see element 24 in FIG. 4). In one embodiment, the OAS 10 includes two lasers and each of the beams of energy 12 are laser beams. However, the present invention is not limited in this respect, as other devices may be employed to form the pattern 16 on the surface 14A, such as, but not limited to, an electron beam emitter. While FIG. 1 shows a flat surface 14A, the present invention is not limited in this regard, as the surface 14A may be any suitable shape, including but not limited to arcuate, cylindrical (e.g., see FIG. 12) and/or spherical (e.g., see FIG. 14).

In one embodiment, the present invention relates to a method for preparing a surface 14A of a substrate 14 for bonding a material (e.g., a flexible liner) 24 thereto, as shown in FIG. 4. FIG. 1 illustrates one example of a system for preparing the surface 14A of the substrate 14 for bonding to a material thereto. As shown in FIG. 1 the OAS 10 includes four drivers 18A, 18B, 18C and 18D in communication with two optical amplification devices (OAD) 10' and 10" and a substrate 14. While four drivers 18A, 18B, 18C and 18D are shown in FIG. 1, the present invention is not limited in this regard, as it is recognized that any number of drivers may be employed without departing from the broader aspects disclosed herein.

As shown in FIG. 1, the OAS 10 has linkages 19, 19', and 19" extending therefrom. The linkage 19' is extendable and retractable with respect to the driver 18A. The linkages 19 and 19A are extendable and retractable with respect to the driver 18B. The linkage 19A' is extendable and retractable with respect to the driver 18C and the linkages 19" and 19A" are extendable and retractable with respect to the driver 18D. In one embodiment illustrated in FIG. 1, the driver 18A and the linkage 19' cooperate to move the OAD 10' and the beam 12 in directions along an axis, "x", "y" and/or "z", and/or rotate the OAD 10' or beam 12 therearound while the substrate 14A remains fixed, e.g. via a fixed setting on the driver 18A.

In another embodiment illustrated in FIG. 1, the driver 18B and the linkage 19 cooperate to move the OAD 10' and the beam 12 axially in directions along the axes, "x", "y" and/or "z", and/or rotate the OAD 10' therearound, while the linkage 19A and the driver 18B cooperate to move the substrate 14 axially along the axes, "x", "y" and/or "z" and/or rotate the substrate 14 therearound. In another embodiment illustrated in FIG. 1, the driver 18D and the linkage 19" cooperate to move the OAD 10" and the beam 12 axially in directions along the axes, "x", "y" and/or "z", and/or rotate the OAD 10" therearound, while the linkage 19A" and the driver 18D cooperate to move the substrate 14 axially along the axes, "x", "y" and/or "z" and/or rotate the substrate 14 therearound. In yet another embodiment, the OAD 10" remains fixed, e.g. via a fixed setting on the driver 18C, while the driver 18C and the linkage 19A' cooperate to move the substrate 14 axially along the axes, "x", "y" and/or "z" and/or rotate the substrate 14 therearound.

The OAS 10 of FIG. 1 includes an OAD 10' operating at an angle other than 90 degrees with respect to the surface 14A of the substrate 14 for bonding and an OAD 10" operating at an angle of 90 degrees with respect to the surface 14A. Although FIG. 1 shows the OAD 10' at an angle other than 90 degrees with respect to the surface 14A of the substrate 14 and an OAD 10" operating at an angle of 90 degrees with respect to the surface 14A, the present invention is not limited in this regard, as the substrate 14 may rotate about an axis "x", "y" and/or "z", and need not remain in a fixed position as shown in FIG. 1.

A "y" axis displacement 11A between the OAD 10" and the surface 14A is adjusted based on the pattern 16 desired. As discussed further herein, the substrate 14 and/or the OAS 10 move relative to one another along the "y" axis, thus dictating the "y" axis displacement 11A. Similarly, an "x" axis displacement 11B, defined by the distance along the "x" axis between a point P1 and a point P2, is adjusted based on the pattern 16. Similarly, a "z" axis displacement 11C, defined by the distance along the "z" axis between the point P1 and the point P2, is adjusted based on the pattern 16. As discussed further herein, the substrate 14 and/or the OAS 10 move relative to one another along the "y" axis, thus dictating the "y" axis displacement 11A. Although FIG. 1 shows only the "x" displacement 11B as changing between the beam 12 emitted from the OAD 10' and the OAD 10", the present invention is not limited in this regard, as any combination of movement along the "x", "y" and "z" and/or therearound resulting in changes in the "y" axis displacement 11A, "x" axis displacement 11B and/or "z" axis displacement 11C, are anticipated.

As shown in FIG. 1, the drivers 18A, 18B, 18C and 18D are attached to a base 17. In one embodiment, the base 17 is a foundation. The present invention is not limited in this regard however, as the base 17 may be any suitable structure, such as a frame, a ceiling or a rack and pinion arrangement.

As illustrated in FIG. 1, the OAS 10 is activated to emit a beam of energy 12. The beam of energy 12 is positioned such that the distance 11 between the OAD 10" and the surface 14A is sufficient to dissipate an amount of energy to form an indentation 22 in the surface 14A of desired depth D1, D2, D3 and D4, as shown in FIGS. 2A, 2B, 2C and 2D.

Figure 7:
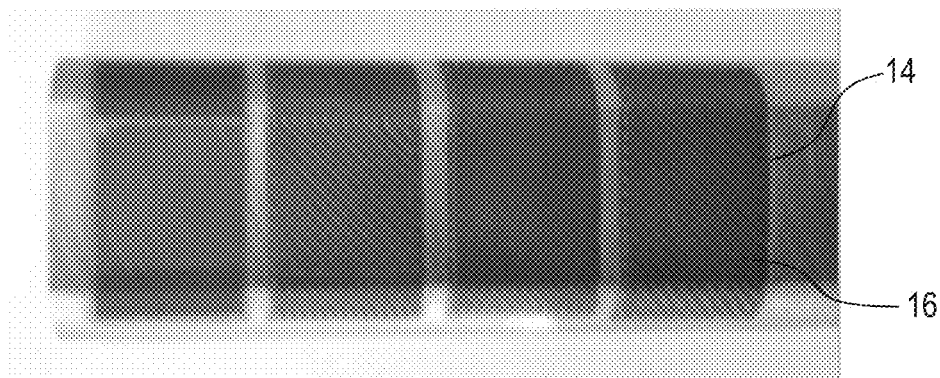
FIG. 7 is a photograph of a surface of a substrate after laser treatment but before bonding, illustrating one example of a pattern to be formed in the surface.
Figure 8:
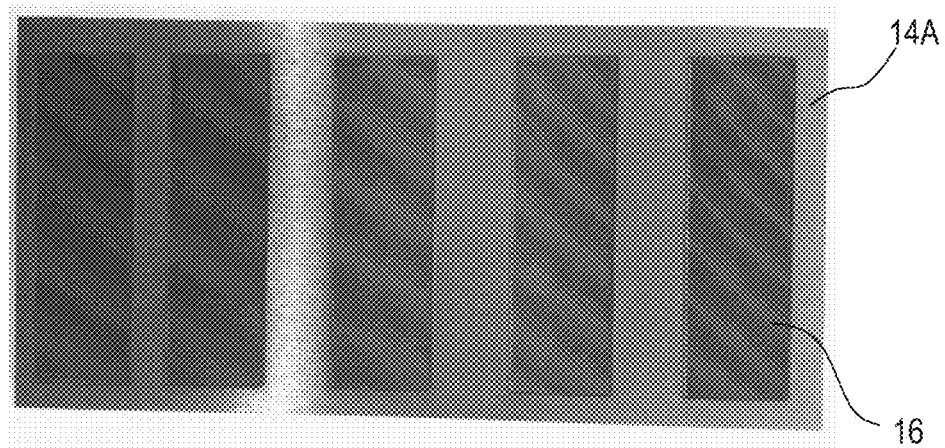
FIG. 8 is a photograph of the surface of the substrate after laser treatment but before bonding, illustrating an alternative embodiment of the surface onto which the pattern may be formed.

As illustrated in FIG. 1, the substrate 14 and/or the OAS 10 move relative to one another via the drivers 18A, 18B, 18C and 18D and the linkages 19, 19', 19", 19A, 19A' and 19A". This movement creates a pattern 16 on the surface 14A via guidance of the OAS 10 and/or the substrate 14, for example via a computer based controller 2. In one embodiment, the drivers 18A, 18B, 18C and 18D and OAS 10 are controlled by a computer based controller 2 having suitable software therein, which is in communication with the drivers 18A, 18B, 18C and 18D and OAS 10 via a plurality of conductors 4. However, the present invention is not limited in this regard, as the drivers 18A, 18B, 18C and 18D and OAS 10 may be controlled by any suitable method, such as, but not limited to, by hand or by wireless signals. The alteration of the surface 14A of the substrate 14 is accomplished by forming indentations 22 therein. The indentations 22 are extended by moving the OAS 10 and/or the substrate 14 to form a plurality of engraved lines, generally designated by the numeral 22, forming the pattern 16, as shown in FIGS. 3A and 3B. Although FIGS. 3A and 3B illustrate a plurality of straight lines 22, the present invention is not limited in this regard, as the pattern 16 may consist of any suitable pattern, including but not limited to a series of curved lines and/or points (see FIGS. 7 and 8) created by rapidly energizing and de-energizing the OAS 10 and changing the "x", "y" and/or "z" coordinates of the OAS 10 before reenergizing the OAS 10.

Figure 13A:
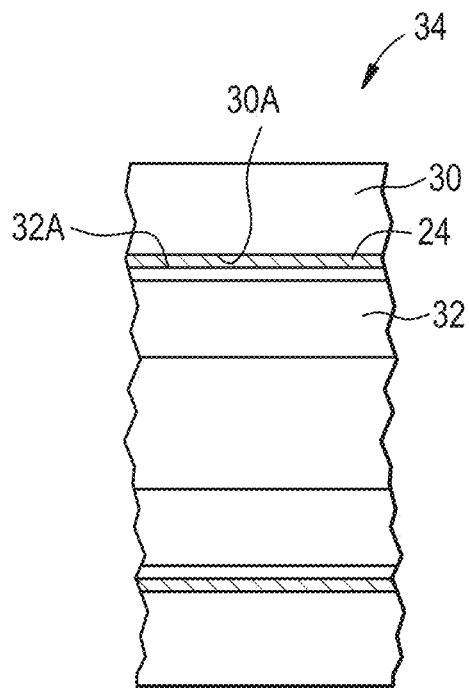
FIG. 13A is a front, partial cross sectional view of one embodiment of the placement of the material on the bearing.
Figure 13B:
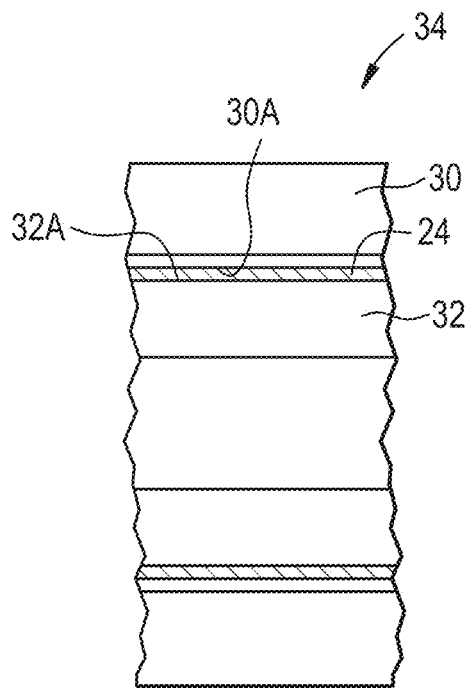
FIG. 13B is a front, partial cross sectional view of another embodiment of the placement of the material on the bearing.
Figure 13C:
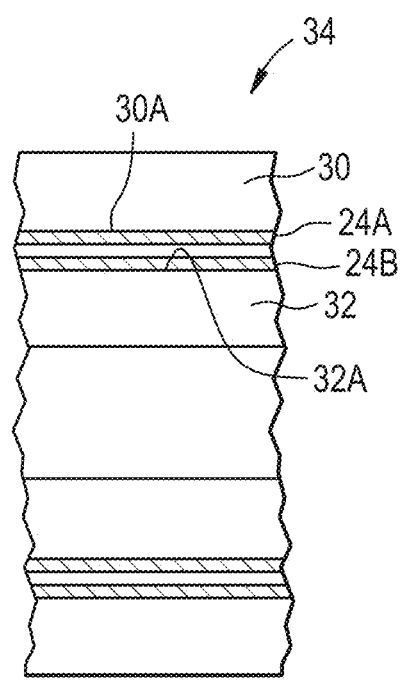
FIG. 13C is a front, partial cross sectional view of another embodiment of the placement of the material on the bearing.

As illustrated in FIGS. 12, 13A, 13B and 13C, in one embodiment, the present invention relates to a method for securing a material 24 (e.g., a flexible liner) to a surface 14A of a bearing 34. The bearing 34 has an inner ring 32 which defines an outer bearing surface 32A. The bearing 34 also has an outer ring 30 which defines an inner bearing surface 30A. A portion of the inner ring 32 is disposed in the outer ring 30. The material 24 is disposed between the outer bearing surface 32A and the inner bearing surface 30A. As shown in FIGS. 12A and 13, the material 24 is secured to the inner bearing surface 32A. While FIGS. 12 and 13A show the material 24 fixed to the inner bearing surface 32A, the present invention is not limited in this regard, as any suitable placement of the material is anticipated, including but not limited to: 1) the material 24 being secured to the outer bearing surface 32A, as illustrated in FIG. 13B and 2) the material 24A being secured to the inner bearing surface 30A and the material 24B is secured to the outer bearing surface 32A, as shown in FIG. 13C.

In the embodiment illustrated in FIGS. 2A, 2B, 2C and 2D, the pattern 16 defines a plurality of protrusions 20 extending from the surface 14A of the substrate 14 and depressions 22 extending into the surface 14A of the substrate 14. The protrusions 20 protrude to the point at which they are level with the surface 14A of the substrate 14. The depressions 22 have a depth D2 and D3 and a width E1, E2, E3, and E4 as shown in FIGS. 2A, 2B, 2C and 2D, respectively.

FIG. 2A shows one embodiment of the pattern 16 in which a series of protrusions 20 and depressions 22 have been created such that the edges 21 defining the protrusions 20 and the depressions 22 are at an angle to one another. The depressions 22 have a depth D2 and a width E1. Although as shown in FIG. 2A, the edges of the pattern 16 which define the protrusions 20 and depressions 22 meet at a point, the present invention is not limited in this respect, as the protrusions 20 and the depressions 22 may meet in any suitable manner, including but not limited to a curve and an obtuse angle.

Figure 2B:
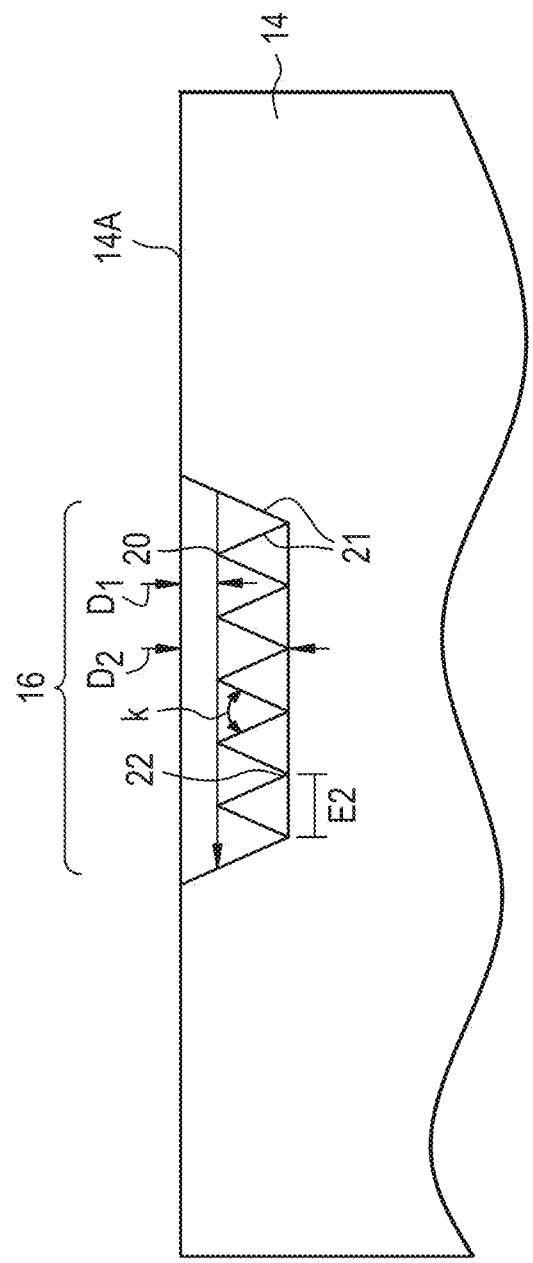
FIG. 2B is a front cross sectional view of the substrate for bonding, wherein the pattern includes countersunk indentations.

FIG. 2B shows another embodiment of the pattern 16 in which a series of protrusions 20 and depressions 22 have been created such that the edges 21 defining the protrusions 20 and the depressions 22 are at an angle to one another, wherein the series of protrusions 20 and depressions 22 are countersunk. The depressions 22 have a depth D2 measured from the surface 14A and a width E2.] The protrusions 20 are countersunk to a depth D1 below the surface 14A. Although as shown in FIG. 2B, the edges of the pattern 16 which define the protrusions 20 and the depressions 22 meet at a point, the present invention is not limited in this respect, as the protrusions 20 and the depressions 22 may meet in any suitable manner, including but not limited to a curve and an obtuse angle.

FIG. 2C shows another embodiment of the pattern 16 in which a series of protrusions 20 and depressions 22 have been created in a manner such that the edges 21 defining the protrusions 20 and the depressions 22 extend parallel to one another. The depressions 22 have a depth D3 and a width E3. Although as shown in FIG. 2C, the edges of the pattern 16 which define the protrusions 20 and the depressions 22 meet at a common line at an orthogonal angle, the present invention is not limited in this respect, as the protrusions 20 and the depressions 22 may meet in any suitable manner, including but not limited to a curve.

FIG. 2D shows another embodiment of the pattern 16 in which a series of protrusions 20 and depressions 22 have been created such that the edges 21 defining the protrusions 20 and the depressions 22 extend parallel to one another, wherein the series of protrusions 20 and the depressions 22 are countersunk. The depressions 22 have a depth D3 measured from the surface 14A and a width E4. The protrusions 20 are countersunk to a depth D4 below the surface 14A. Although as shown in FIG. 2D, the edges of the pattern 16 which define the protrusions 20 and the depressions 22 meet at a common line at an orthogonal angle, the present invention is not limited in this respect, as the protrusions 20 and depressions 22 may meet in any suitable manner, including but not limited to a curve.

As illustrated in FIGS. 3A and 3B, the pattern 16 is defined by a plurality of rows of lines 22A, 22B and 22C. In one embodiment, as shown in FIG. 3A, the rows of lines extend vertically 22A and horizontally 22B. In another embodiment, as shown in FIG. 3B, the rows of lines extend vertically 22A, horizontally 22B and diagonally 22C. In one embodiment, shown in FIGS. 3A and 3B, the rows of lines run parallel to one another; however, the present invention is not limited in this regard, as the lines may meet at any suitable angle, including but not limited to meeting at 45 degrees, being arcuate and/or not meeting at all.

In one embodiment, the prior to forming the pattern 16 on the surface 14A of the substrate 14, any debris which may be on the surface 14A is removed. In one embodiment, removing the debris consists of degreasing the surface. In another embodiment, removing the debris consists of wiping clean the surface 14A of dust, grease and/or other matter which may interfere with the precision of the forming of the pattern 16 and/or the adhesiveness of resin 27 to the surface 14A and/or the material 24. Though the step prior to forming the pattern 16 on the surface 14A is removing any debris from the surface 14A, the present invention is not limited in this regard, as any suitable step to enhance the precision with which the pattern 16 is formed, the adhesiveness of the resin 27 to the surface 14A and/or the material 24 and/or any beneficial element to bonding prior to forming the pattern, including but not limited to taking no preparatory action, such as not removing debris from the surface 14A may be taken.

In one embodiment, the pattern 16 defines a shape having predetermined dimensions W1 and W2, as shown in FIGS. 3A and 3B. The forming of the pattern 16 in the shape controls the predetermined rectangular dimensions W1 W2 within a tolerance of ±0.002 inches. Formation of the pattern 16 via this method eliminates the need for masking. In one embodiment, the elements of the pattern 16 formed which defines the shape of the pattern 16 are formed with a laser 10. However, the present invention is not limited in this respect, as any suitable piece of equipment may be used to form the pattern, including but not limited to an electron beam emitter. Although in one embodiment, the pattern 16 formed is rectangular, the present invention is not limited in this respect, as any suitable shape, including but not limited to a circle, a complex shape and a square, is anticipated.

In one embodiment, the surface 14A of the substrate 14 for bonding is a plated surface. The power of the OAS 10 is such that a pattern 16 may be formed on the plated surface without damaging the plating, for example absence of peeling of the plating and/or absence of penetration of the plating. In one embodiment, the pattern 16 is formed only on the plating. The present invention is, however, not limited in this regard, as altering the power of the OAS 10 to form the pattern 16 on the plating as well as the surface 14A below the plating is anticipated. Although plating is one surface type for which the method of the present invention is suited, the present invention is not limited in this regard, as the surface may any suitable surface, such as, but not limited to, an anodized surface, a surface prepared by chemical etching, a surface prepared by blasting and a surface prepared by grinding.

In one embodiment, the OAS 10 is a laser which emits a beam of light 12. Though in the embodiment illustrated in FIG. 1, a laser is used, the present invention is not limited in this respect, as it is anticipated that the OAS 10 be replaced by any suitable device, such as an electron beam emitter. The present invention is also not limited with regards to the type of laser, wavelength of light emitted by the laser, and/or power of the laser, as any suitable combination thereof may be employed.

As shown in FIG. 1, the beams of energy 12 are emitted from the OAS 10. In one embodiment, the beam of energy 12 comprises light waves in the range of 150 nanometers to 10 micrometers and a power up to 10 kW. In one embodiment, described herein, the OAS 10 is a laser and the beam of energy 12 which forms the pattern 16 on the surface of the substrate for bonding 14 is a laser beam. In one embodiment, the laser 10 creates an indentation 22 in the surface 14A of the substrate 14 for bonding by way of altering the density, structural arrangement, state of matter or other characteristics of the material of the substrate 14, or removed portions of the surface 14A altogether.

In one embodiment, the substrate 14 is defined by at least a portion of a radially outward extending surface 32A defined by an inner race 32 (e.g., a pin) of a bearing 34 and/or an inner surface 30A defined by an outer race 30 of a bearing 34, as shown in FIGS. 12, 13A, 13B and 13C. In one embodiment, the surface 14A of the substrate 14 is an inner bearing surface 32A, as shown in FIGS. 12 and 13A. The present invention is not limited in this regard, however, as any suitable surface of the bearing 34 may be prepared for bonding using the method disclosed herein, including but not limited to an outer bearing surface 32A, as illustrated in FIG. 13B, and both the inner bearing surface 30A and the outer bearing surface 32A, as shown in FIG. 13C.

Figure 14:
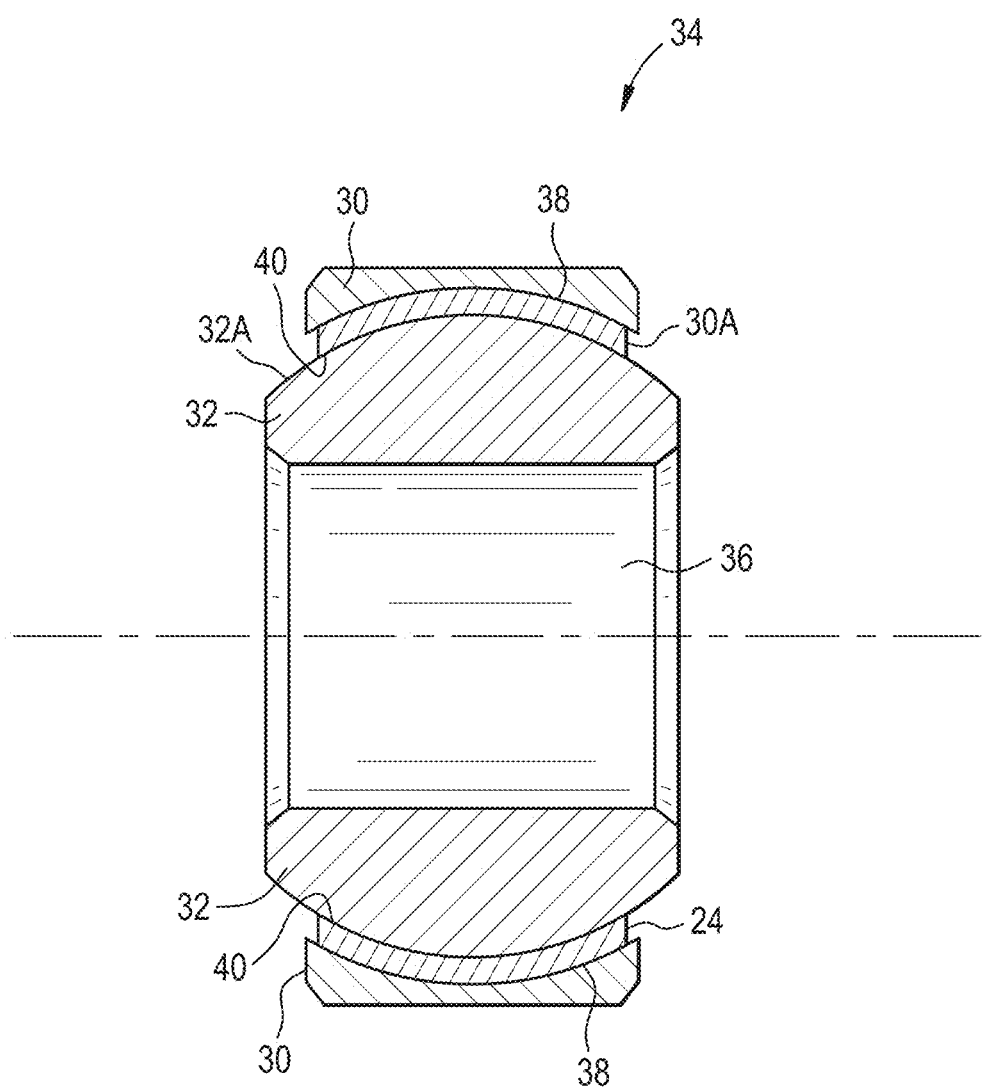
FIG. 14 is a side cross sectional view of spherical bearing illustrating substrates thereon for surface preparation.

In one embodiment, as shown in FIG. 14, the substrate for bonding is a spherical plain bearing assembly of a swaged configuration 34, referred to hereinafter as bearing assembly 34. Bearing assembly 34 includes an inner member or a ball 32 positioned in an outer member or an outer race 30. A central axis "A1" is defined through the bearing assembly 34. The ball 32 defines an outer surface 32A, a portion of which is an outer engagement surface 40. The ball 32 further defines a bore 36 extending therethrough and adapted to receive a portion of a shaft or other component therein. The present invention is not so limited, as the ball 32 may be integral with or form part of a shaft or other component. Moreover, while the bore 36 is shown and described as extending through the ball 32, the present invention is not limited in this regard as the bore can extend part-way through the ball, the bore may define a stepped-bore, or the ball may not define a bore without departing from the broader aspects of the invention.

In the illustrated embodiment, the outer race 30 is a ring having an inner surface, a portion of which is an inner engagement surface 38 on which a liner 24 is disposed. The liner 24 slidingly engages the outer engagement surface 40 of the ball 32. The inner engagement surface 38 is contoured to a shape complementary to the outer engagement surface 40 of the ball 32. As shown, at least a portion of the inner engagement surface 38 is concave, and at least a portion of the outer surface 40 of the ball 32 is convex. When the ball 32 is located in the outer race 30, the outer surface 32A slidingly engages the liner 24. While the outer race 30 has been shown and described as being a ring, the present invention is not limited in this regard as the outer race can assume any practical shape or be integrally formed as part of another component, such as, for example a housing, without departing from the broader aspects of the invention. Although, the liner 24 is shown and described as being disposed on the inner engagement surface 38 of the outer race 30, the present invention is not limited in this regard as the liner 24 may be disposed on the outer engagement surface 40 of the ball 32 and slidingly engage the inner engagement surface 38 of the outer race 30.

The ball 32 is made from any suitable material, such as metal or alloys. Suitable metals and alloys from which the ball 32 may be fabricated include, but are not limited to, stainless steels (e.g., 440C, A286, and the like), nickel-chromium-based superalloys (e.g., Inconel and the like), titanium, titanium alloys, silicon nitride, silicon carbide, zirconium, and the like.

The outer race 30 is made from any suitable material, such as metal or alloys. Suitable metals from which the outer race 30 may be fabricated include, but are not limited to, stainless steels (e.g., 17-4 PH stainless steel), titanium, titanium alloys, and the like. The present invention is not so limited, however, as ceramics may be used in the construction of the outer race 30. Although a spherical bearing is described herein, the present invention is not limited in this regard, as any suitable bearing may be used, including but not limited to a journal bearing and a roller bearing.

In an alternative embodiment, the surface 14A is an anodized surface. However, the present invention is not limited in this regard, as the surface may be a surface prepared by chemical etching, a surface prepared by blasting, a surface prepared by grinding or a machined surface. In another embodiment, the surface for bonding 14A is a raw surface. As used herein, a raw surface is a surface to which no preparatory measures have been applied (e.g., a surface of a substrate such as wrought, as-cast and as-forged surfaces).

Figure 9:
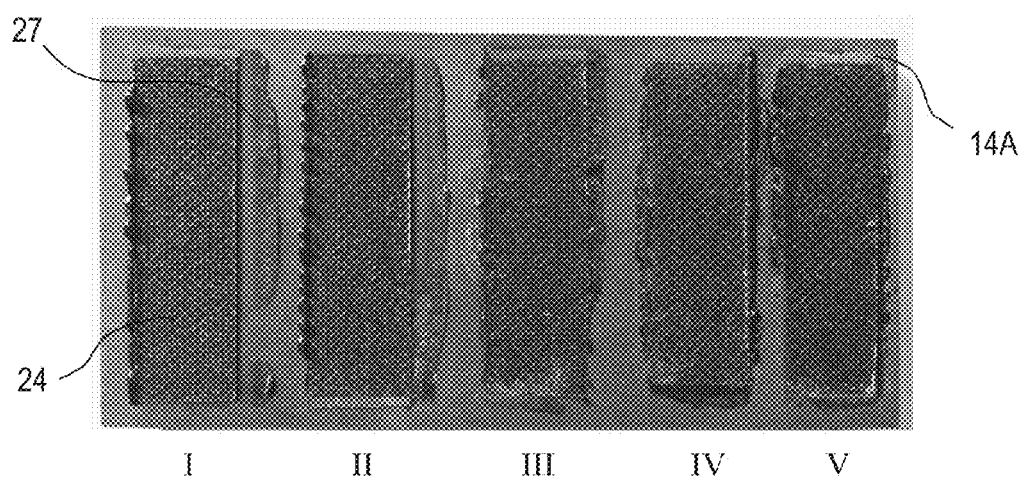
FIG. 9 is a photograph of the surface of FIG. 8 after administration of a peel test, illustrating the residue of material and resin on the bonded surfaces after the peel test.

As illustrated in FIGS. 4 and 9, the present invention relates, in one embodiment, to a method of bonding a material 24 to the substrate 14. The material 24 is bonded to the surface 14A of the substrate 14 using an adhesive 27. In one embodiment, the substrate 14 is a metal and the adhesive 27 is a resin. However, the present invention is not limited in this regard, as any suitable material for the substrate 14 and any suitable adhesive 27 may be used, including but not limited to aluminum, titanium, resins, steel, stainless steel and multicomponent adhesives, without departing from the broader aspects of this invention. The surface 14A, having been prepared in the manner disclosed herein, has an increased surface area over which bonding between the adhesive 24 and the surface 14A occurs. In one embodiment, the pattern 16 used increased surface area for bonding by 25%. The benefits of this increase in surface area include stronger bonding, as disclosed herein.

A peel test, shown in FIG. 5, was conducted on the bond between the substrate 14 and the material 24. In one embodiment, the material 24 is attached to a clamp, and the substrate 14 is secured to a base. The material is then pulled away from the substrate in a direction A at an angle C and the mechanical properties of the bond, such as bond integrity and bond strength, are measured. Although FIG. 5 shows the material 24 being pulled away from the substrate 14 at the angle C of 45 degrees (a 45 degree peel test), the present invention is not limited in this regard, as the material 24 may be peeled away from the substrate 14 at any suitable angle C, including but not limited to 90 degrees and 180 degrees.

Figure 6:
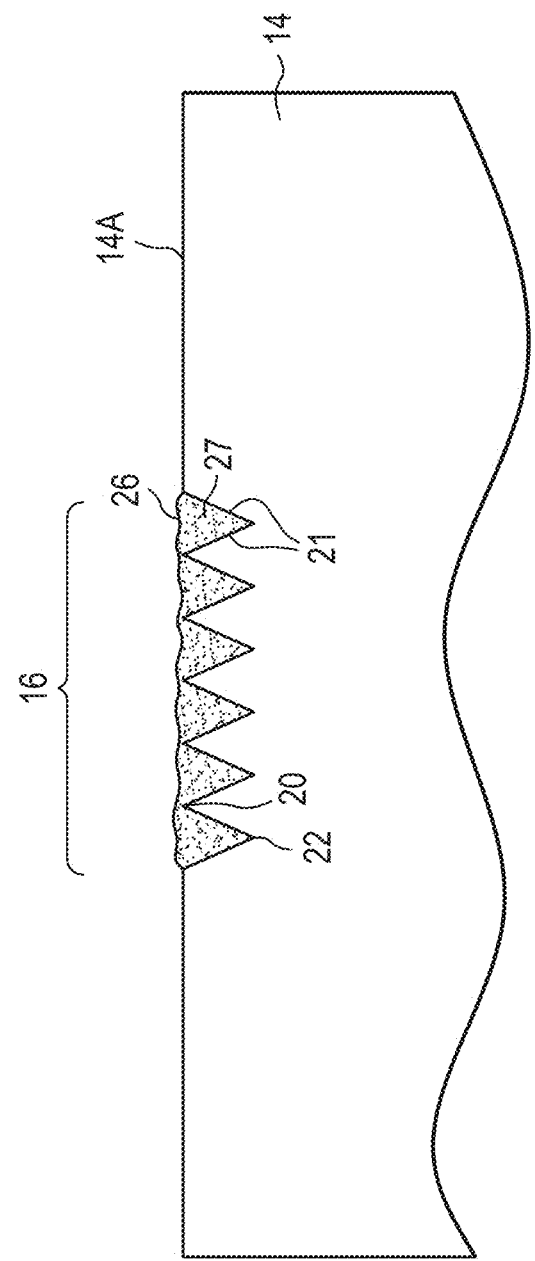
FIG. 6 is a front cross sectional view of the substrate in which the material has been peeled from the surface of the substrate, wherein residue from the material and residue from a resin remain attached to the surface of the substrate.
Figure 10:
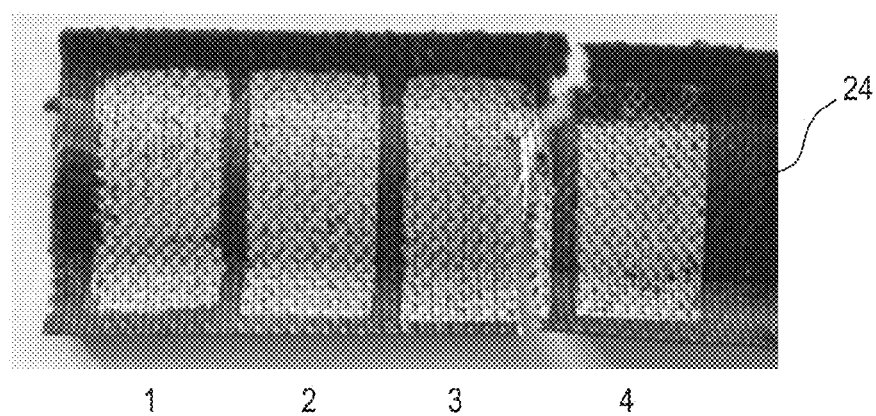
FIG. 10 is a photograph of the material after being removed from the substrate of FIG. 7, illustrating that that the resin was removed from the material, and the material tore during the peel test.
Figure 11:
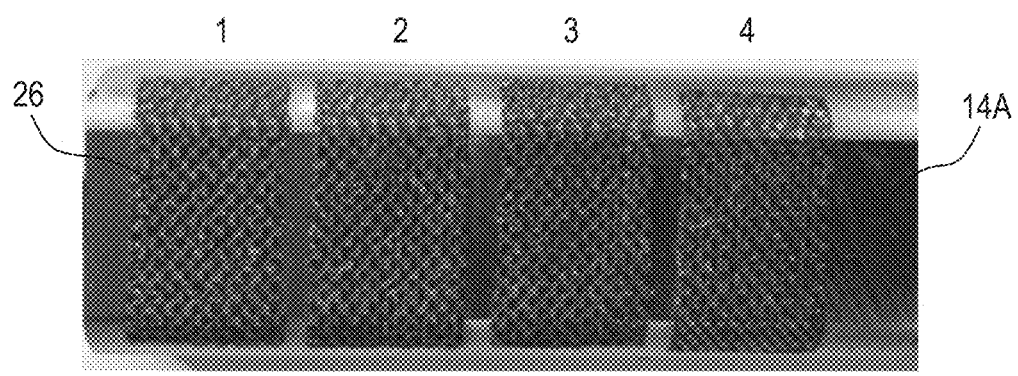
FIG. 11 is a photograph of the surface of FIG. 7, illustrating the resin and a portion of the material stuck to the surface of the substrate.

As shown in FIGS. 6 and 11, the peel test of FIG. 5 resulted in a residue 26 of the material 24 as well as the adhesive 27 being left on the surface 14A of the substrate 14. In one embodiment, this is evidence that the increased surface area created via the method herein increased the strength of the bond compared to other surfaces (such as smooth, sandblasted or shot peened surfaces) to such a degree that the force required to remove the adhesive 27, and thereby the material 24, from the surface 14A was greater than the coherent forces holding the material 24 together. This resulted in the material 24 detaching from the surface 14A and ripping, as shown in FIG. 10.

Although FIGS. 6 and 11 show cases in which the force required to remove the adhesive, and thereby the material 24, from the surface 14A was greater than the coherent strength of the material 24, the present invention is not limited in this regard, as the force required to remove the adhesive, and thereby the material 24, from the surface 14A may instead be either greater than or equal to the coherent strength of the material 24, thereby causing the adhesive to completely or partially detach from the surface and/or the material to completely or partially detach from the adhesive, in some cases ripping. Although these results differ from those shown in FIGS. 6, 10 and 11, the force required to peel the material 24 from the surface 14A is still, in these cases, higher than they would be had the previously specified method not been employed in preparation of the surface 14A. In one embodiment, the force required to peel the material 24 from the surface 14A using the surface preparation method described herein was 7 times that required to peel the material 24 from the surface 14A when the surface preparation method described herein was not used. However, the present invention is not limited in this regard, as the force required to peel the material 24 from the surface 14A may be less than or equal to what they would be had the previous method not been employed.

In the embodiment illustrated in FIGS. 12, 13A, 13B and 13C, the present invention relates to a method of securing the material 24 to a surface 30A 32A of a bearing 34. In one embodiment, an inner ring 32 has an outer bearing surface 32A and an outer ring 30 has an inner bearing surface 30A. The inner ring 32 is disposed in the outer ring 30. A material 24 (e.g., a flexible material) is disposed between the outer bearing surface 32A and the inner bearing surface 30A, as shown in FIGS. 12, 13A, 13B and 13C. Although FIG. 12 shows the inner ring 32 being disposed completely in the outer ring 30, the present invention is not limited in this regard, as the inner ring 32 may be partially disposed in the outer ring 30. In one embodiment, the present invention relates to the forming of the pattern 16 on the surface 14A of the substrate 14 for bonding, wherein the surface 14A is an inner bearing surface 30A and/or an outer bearing surface 32A and the substrate 14 for bonding is the bearing 34, using the method described herein. However, the present invention is not limited in this regard, as any suitable surface 14A and substrate 14 may be used, including but not limited to a metal plate, a surface of a journal bearing and a surface of a spherical bearing.

The method described herein has been substantiated with a significant amount of test data. The inventors spent over 175-200 hours spanning well over a year conducting detailed testing of various methods of surface preparation, including use of a laser 10. Multiple power levels of the laser 10, various frequencies of light 12 and different types of lasers 20 are among the numerous embodiments tested by the inventors. Various patterns 26, different depths of components of the patterns 26 and several types of adhesive were tested. It was found that different patterns yield different peel strengths. Patterns 26 exist which optimize peel strength for a given adhesive and substrate material type. It would not be obvious to one reasonably skilled in the art that the use of a laser 10 to form the pattern 16 on the surface 14A would result the precision of the formation of the pattern 16 to be within 0.002 inches, nor would it be obvious to such a person that a bonding a material to a surface on which a particular pattern has been formed yields a higher peel strength than any other. Attempts by others to create a method whereby the material 24 is bonded to the substrate 14 wherein masking is not required, peel strength is increased and the pattern 16 is formed on the surface 14A with a high degree of precision have been met with limited success. These attempts have failed to combine all of the desired attributes which are embodied in the present invention.

Although the invention has been described with reference to particular embodiments thereof, it will be understood by one of ordinary skill in the art, upon reading and understanding of the foregoing disclosure, that numerous variations and alterations to the disclosed embodiments will fall within the spirit and scope of this invention and of the appended claims.

What is claimed is:

1. A method for preparing a surface of a bearing for bonding a flexible liner to the surface and for bonding the flexible liner to the bearing, the method comprising the steps of:
   providing at least one driver and at least one optical amplification device, wherein the at least one driver is moveably coupled to at least one of the at least one optical amplification device and the bearing;

providing an adhesive and the flexible liner;

the bearing comprising a metallic inner ring which defines a convex outer bearing surface, the bearing comprising a metallic outer ring which defines a concave inner bearing surface, a portion of the inner ring being disposed in the outer ring;

activating the at least one optical amplification device to emit a beam of energy;

moving at least one of the at least one optical amplification device and the bearing relative to one another; and forming a pattern on at least one of the convex outer bearing surface and the concave inner bearing surface with the beam of energy;

applying the adhesive to at least one of a portion of the convex outer bearing surface having the pattern formed thereon, the concave inner bearing surface having the pattern formed thereon and the flexible liner;

securing the flexible liner to at least one of the convex outer bearing surface and the concave inner bearing surface.

2. The method of claim 1, wherein the pattern defines a plurality of protrusions extending from the surface and depressions extending into the surface.

3. The method of claim 1, wherein the pattern defines a plurality of rows of lines.

4. The method of claim 1, wherein prior to forming the pattern, debris is removed from said surface.

5. The method of claim 1, wherein the forming of the pattern, is performed with debris on the surface.

6. The method of claim 1, wherein the pattern defines a shape having predetermined dimensions, wherein the forming of the pattern in the shape controls the predetermined dimensions to a tolerance of 0.0508 mm (0.002 inches).

7. The method of claim 1, wherein at least one of the convex outer bearing surface and the concave inner bearing surface is at least one of a plated surface, an anodized surface, a surface prepared by chemical etching, a surface prepared by blasting, a surface prepared by grinding, a raw surface and a machined surface.

8. The method of claim 1, wherein the optical amplification device comprises a laser.

9. A method of bonding a flexible liner to a bearing, the method comprising the steps of:

providing the bearing, the bearing comprising a metallic inner ring which defines a convex outer bearing surface, the bearing comprising a metallic outer ring which defines a concave inner bearing surface, a portion of the inner ring being disposed in the outer ring;

providing the flexible liner for bonding;

providing an adhesive;

providing at least one driver and at least one optical amplification device, wherein the at least one driver is moveably coupled to at least one of the at least one optical amplification devices and the bearing;

activating the at least one optical amplification device to emit a beam of energy; and moving at least one of the at least one optical amplification devices and the bearing relative to one another;

forming a pattern on at least one of the convex outer bearing surface and the concave inner bearing surface with the beam of energy;

applying the adhesive to at least one of a portion of the convex outer bearing surface having the pattern formed thereon, the concave inner bearing surface having the pattern formed thereon and the flexible liner; and securing the flexible liner to at least one of the convex outer bearing surface and the concave inner bearing surface;

wherein the flexible liner for bonding has an adhesion strength defined by a peel test result, in which a portion of at least one of the adhesive and the flexible liner remain adhered to a portion of the bearing having the pattern thereon, after the flexible liner is peeled away from the bearing.

10. The method of claim 9, wherein the pattern defines a plurality of protrusions and depressions.

11. The method of claim 9, wherein the pattern defines a plurality of rows of lines.

12. The method of claim 9, wherein prior to forming the pattern on the surface, debris is removed from said surface.

13. The method of claim 9, wherein the forming of the pattern on the surface is performed with debris on the surface.

14. The method of claim 9, wherein the pattern defines a shape having predetermined dimensions, wherein the forming of the pattern in the shape controls the predetermined dimensions.

15. The method of claim 9, wherein at least one of the convex outer bearing surface and the concave inner bearing surface is at least one of a plated surface, an anodized surface, a surface prepared by chemical etching, a surface prepared by blasting, a surface prepared by grinding, a raw surface, an unprepared surface, and a machined surface.

16. The method of claim 9, wherein the optical amplification device comprises a laser.

17. A method of securing a flexible liner to a surface of a bearing, the method comprising the steps of:

providing an inner ring which defines a convex outer bearing surface and an outer ring which defines a concave inner bearing surface, the inner ring being disposed at least partially in the outer ring and the flexible liner is disposed between the convex outer bearing surface and the concave inner bearing surface;

providing an adhesive;

providing at least one driver, a base and at least one optical amplification device, wherein the driver is moveably coupled to at least one of the at least one optical amplification device and the bearing;

activating the optical amplification device to emit a beam of energy;

moving at least one of the at least one optical amplification device, the concave inner bearing surface and the convex outer bearing surface relative to one another;

forming a pattern on at least one of the concave inner bearing surface and the convex outer bearing surface with the beam of energy;

applying the adhesive to a portion of at least one of the concave inner bearing surface and the convex outer bearing surface having the pattern formed thereon and the material; and securing the flexible liner for bonding to the portion of at least one of the concave inner bearing surface and the convex outer bearing surface having the pattern formed thereon;

wherein the flexible liner for bonding has an adhesion strength defined by a peel test result, in which a portion of a tleast one of the adhesive and the flexible liner remain adhered to a portion of at least one of the concave inner bearing surface and the convex outer bearing surface having the pattern thereon, after the flexible liner is peeled away from the portion of at least one of the concave inner bearing surface and the convex outer bearing surface.

18. The method of claim 1, wherein a force required to remove the adhesive and the flexible liner from the convex outer surface and the concave inner surface is greater than coherent forces holding the flexible liner together.

* * * * *

UNITED STATES PATENT AND TRADEMARK OFFICE
CERTIFICATE OF CORRECTION

PATENT NO. : 9,919,502 B2
APPLICATION NO. : 14/692705
DATED : March 20, 2018
INVENTOR(S) : Louis Bourgois Page 1 of 1

It is certified that error appears in the above-identified patent and that said Letters Patent is hereby corrected as shown below:

In the Claims

Claim 18
Column 13, Line 5: After "outer", please insert --bearing--, and after "inner", please insert --bearing--.

Signed and Sealed this
Twentieth Day of November, 2018

Andrei Iancu
*Director of the United States Patent and Trademark Office*